(12) United States Patent
Yasui

(10) Patent No.: US 6,868,843 B2
(45) Date of Patent: Mar. 22, 2005

(54) ENGINE BLOWBY GAS PROCESSING SYSTEM

(75) Inventor: Hisakazu Yasui, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 24 days.

(21) Appl. No.: 10/401,765

(22) Filed: Mar. 31, 2003

(65) Prior Publication Data
US 2003/0226553 A1 Dec. 11, 2003

(30) Foreign Application Priority Data
Jun. 7, 2002 (JP) ........................................ 2002-167621

(51) Int. Cl.[7] .............................. F02M 35/16; F01N 3/30
(52) U.S. Cl. ...................................................... 123/572
(58) Field of Search ................................. 123/572–574

(56) References Cited

U.S. PATENT DOCUMENTS 6,425,451 B2 * 7/2002 Yoshida et al. ............. 180/219
6,598,595 B2 * 7/2003 Yasui ......................... 123/572
6,651,635 B2 * 11/2003 Kunimitsu et al. ......... 123/572

FOREIGN PATENT DOCUMENTS

JP 2639608 B2 5/1997

* cited by examiner

Primary Examiner—Marguerite McMahon
(74) Attorney, Agent, or Firm—Birch, Stewart, Kolasch & Birch, LLP

(57) ABSTRACT

A blowby gas processing system includes a breather tube extended from a breather port of an engine and connected to a connecting tube. A breather tube inside which an intake passage connecting a carburetor and an air cleaner is formed and an expanded part provided with a gas-liquid separating chamber adjacent to the intake passage are provided. An entrance joint connecting a lower part of the gas-liquid separating chamber to the breather tube is integrated on one side of the connecting tube and a blowby gas exit communicating the upside of the gas-liquid separating chamber with the intake passage is provided in a partition between the gas-liquid separating chamber and the intake passage. The system is a low cost system having a simplified design enabling oil to be separated from blowby gas without having to include a special oil separator tank before the breather tube.

15 Claims, 11 Drawing Sheets

ENGINE BLOWBY GAS PROCESSING SYSTEM

BACKGROUND OF THE INVENTION

CROSS-REFERENCES TO RELATED APPLICATIONS

This nonprovisional application claims priority under 35 U.S.C. § 119(a) on patent application Ser. No. 2002-167621 filed in Japan on Jun. 7, 2002, the entirety of which is herein incorporated by reference.

1. Field of the Invention

The present invention relates to a system for processing blowby gas of an engine, and more particularly to the improvement of a system in which a breather tube extending from a breather port for exhausting blowby gas of an engine is connected to a connecting tube. An intake passage connecting a carburetor and an air cleaner is formed inside the connecting tube, and blowby gas in a crankcase of the engine is circulated in the engine through the breather tube and the intake passage during a combustion cycle of the engine.

2. Description of the Background Art

Japanese published examined patent application No. 2639604 describes an engine blowby gas processing system of the background art in which an oil separator tank is included for separating oil included in the blowby gas. The blowby gas is guided into an intake passage in a connecting tube and the oil is returned to the side of a crankcase of an engine on the way to a breather tube.

However, the present inventors have determined that the background art suffers from the following disadvantages. When the oil separator tank is positioned before the breather tube as described above, a special tank is required. In addition, the engine in some way must support the tank, additional structure is required to be provided, e.g., the number of parts is increased, and the cost is increased.

SUMMARY OF THE INVENTION

The present invention overcomes the shortcomings associated with the background art and achieves other advantages not realized by the background art.

An object of the present invention is to provide an engine blowby gas processing system having a simplified structure.

An object of the present invention is to provide a low cost, engine blowby gas processing system enabling oil to be separated from the blowby gas without inserting a special oil separator tank on the way to a breather tube.

One or more of these and other objects are accomplished by an engine blowby gas processing system for an engine comprising an air cleaner; a carburetor; a breather port of the engine; a breather tube extending from the breather port for exhausting blowby gas of the engine, the breather tube being connected to a connecting tube; an intake passage being formed within the connecting tube and connecting the carburetor and the air cleaner; an expanded portion being provided with a gas-liquid separating chamber adjacent to the intake passage, wherein an entrance joint connecting a lower part of the gas-liquid separating chamber and the breather tube are integrally formed on a first side of the connecting tube; and a blowby gas exit communicating the upper portion of the gas-liquid separating chamber with the intake passage being provided in a partition between the gas-liquid separating chamber and the intake passage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
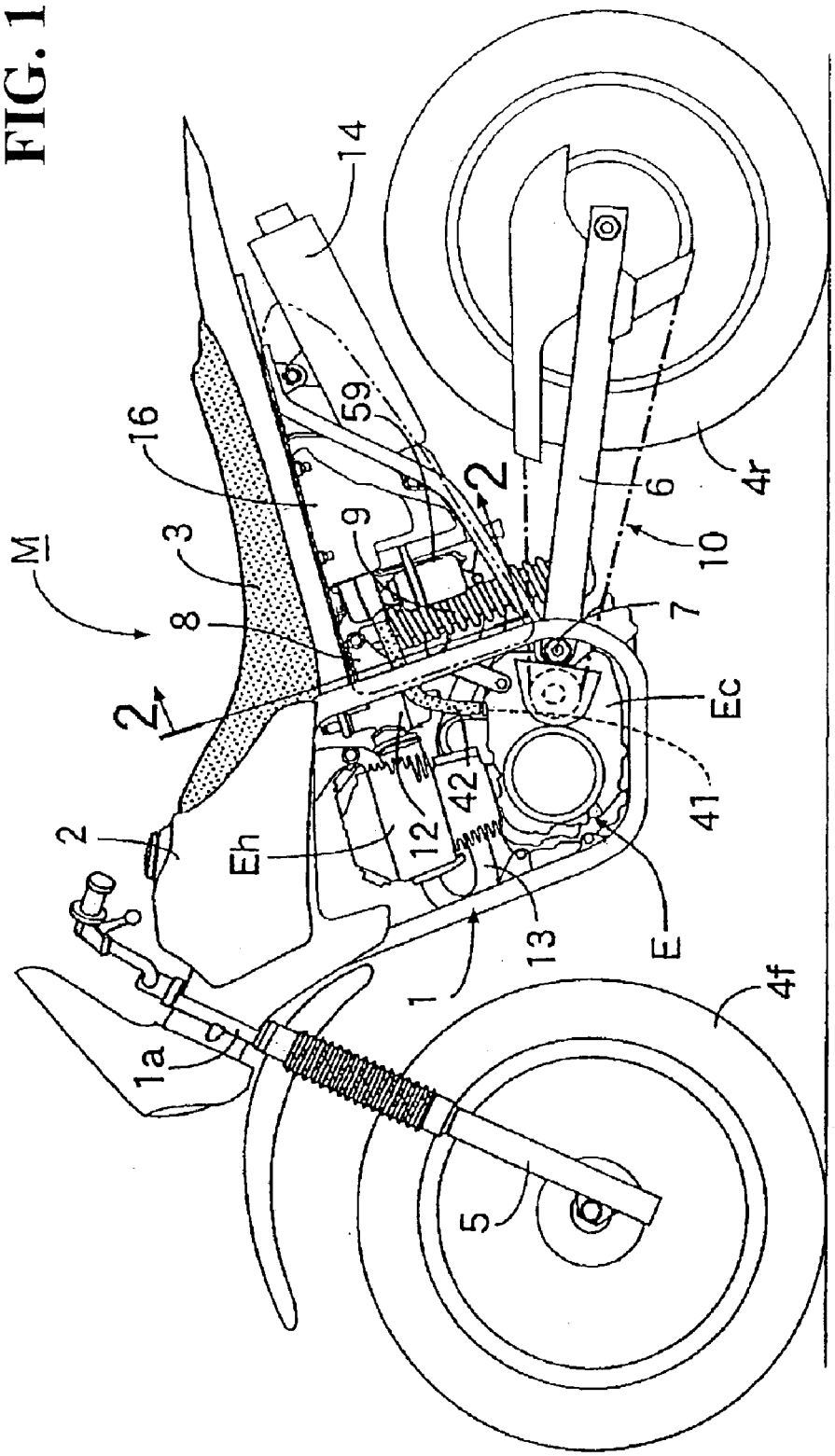
FIG. 1 is a left side view showing a motorcycle provided with a blowby gas processing system according to an embodiment of the present invention.
Figure 2:
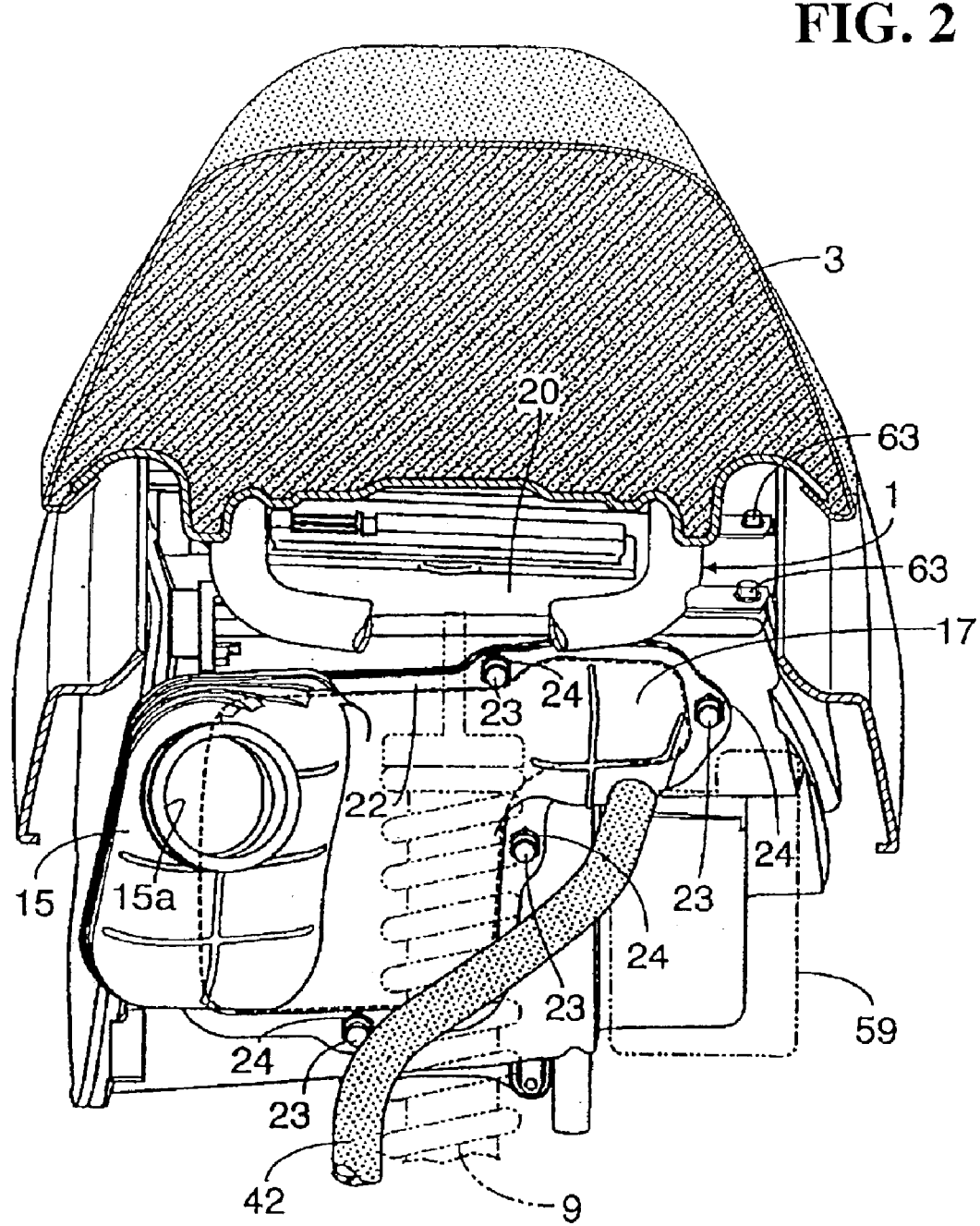
FIG. 2 is an enlarged sectional view viewed along a line 2—2 in FIG. 1.
Figure 3:
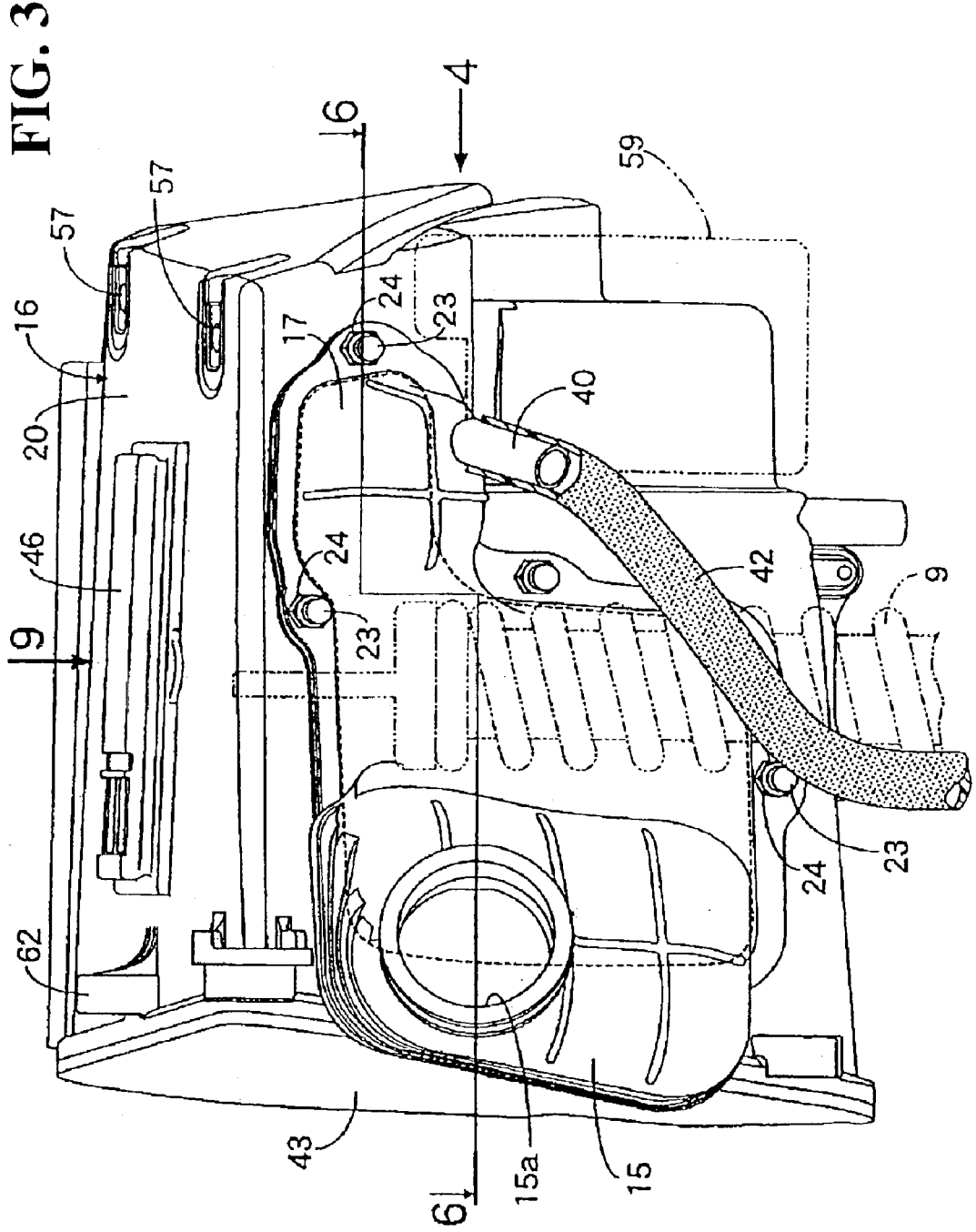
FIG. 3 is an enlarged view showing a main part of a portion shown in FIG. 2.
Figure 4:
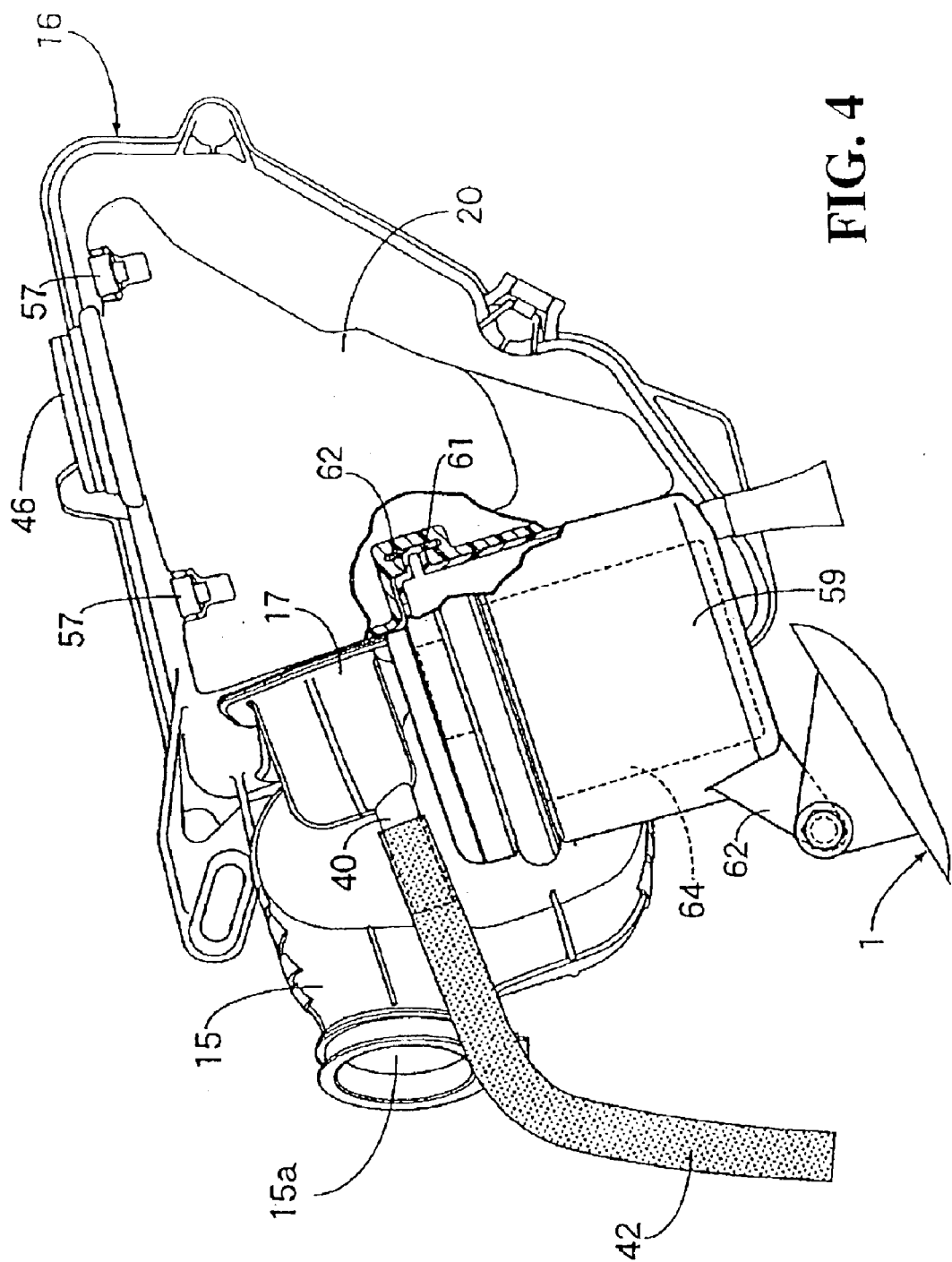
FIG. 4 is a view taken along a direction shown by an arrow 4 in FIG. 3.
Figure 5:
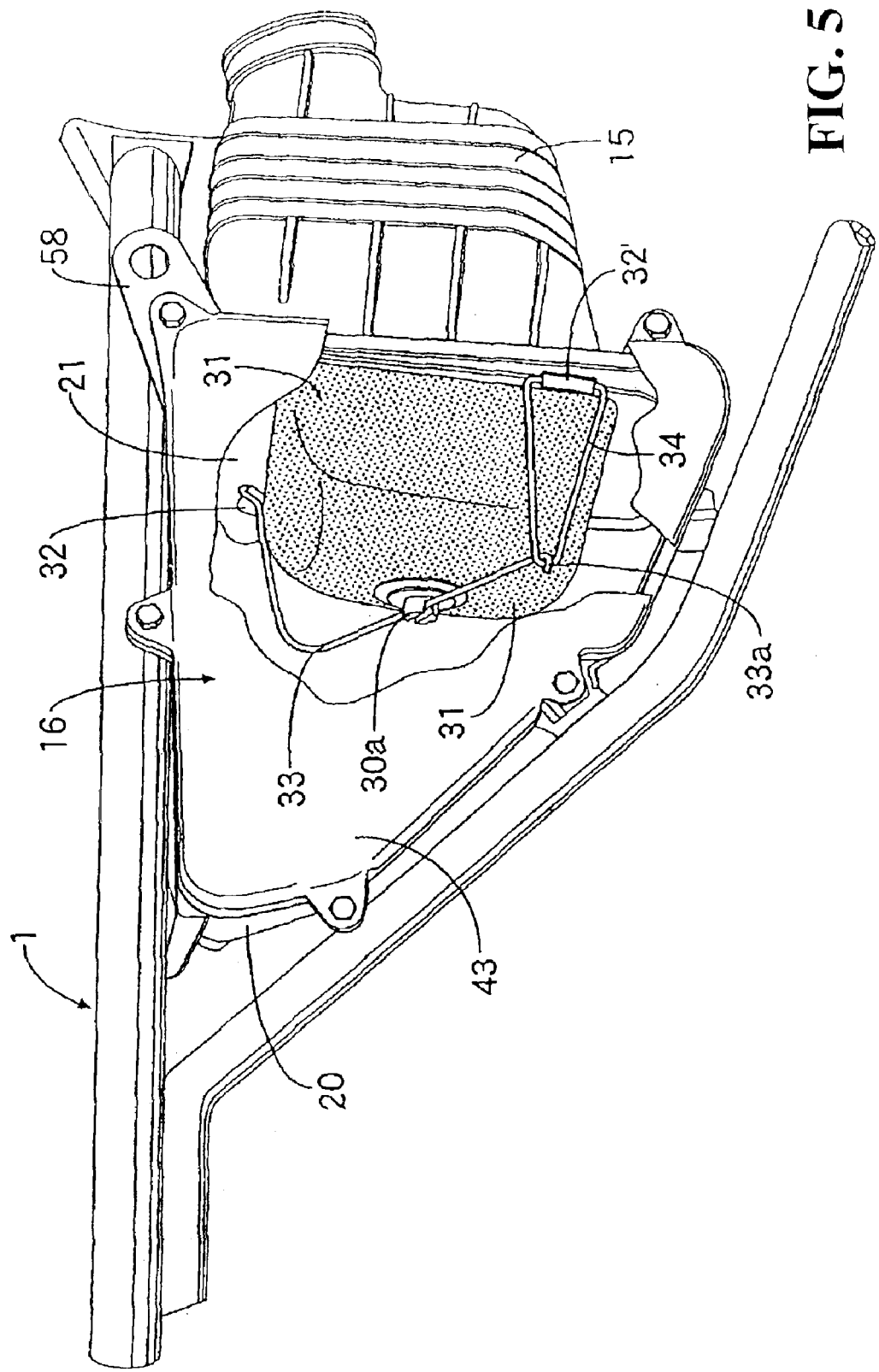
FIG. 5 is a side view showing a periphery of an air cleaner viewed from the side opposite to the side shown in FIG. 1.
Figure 6:
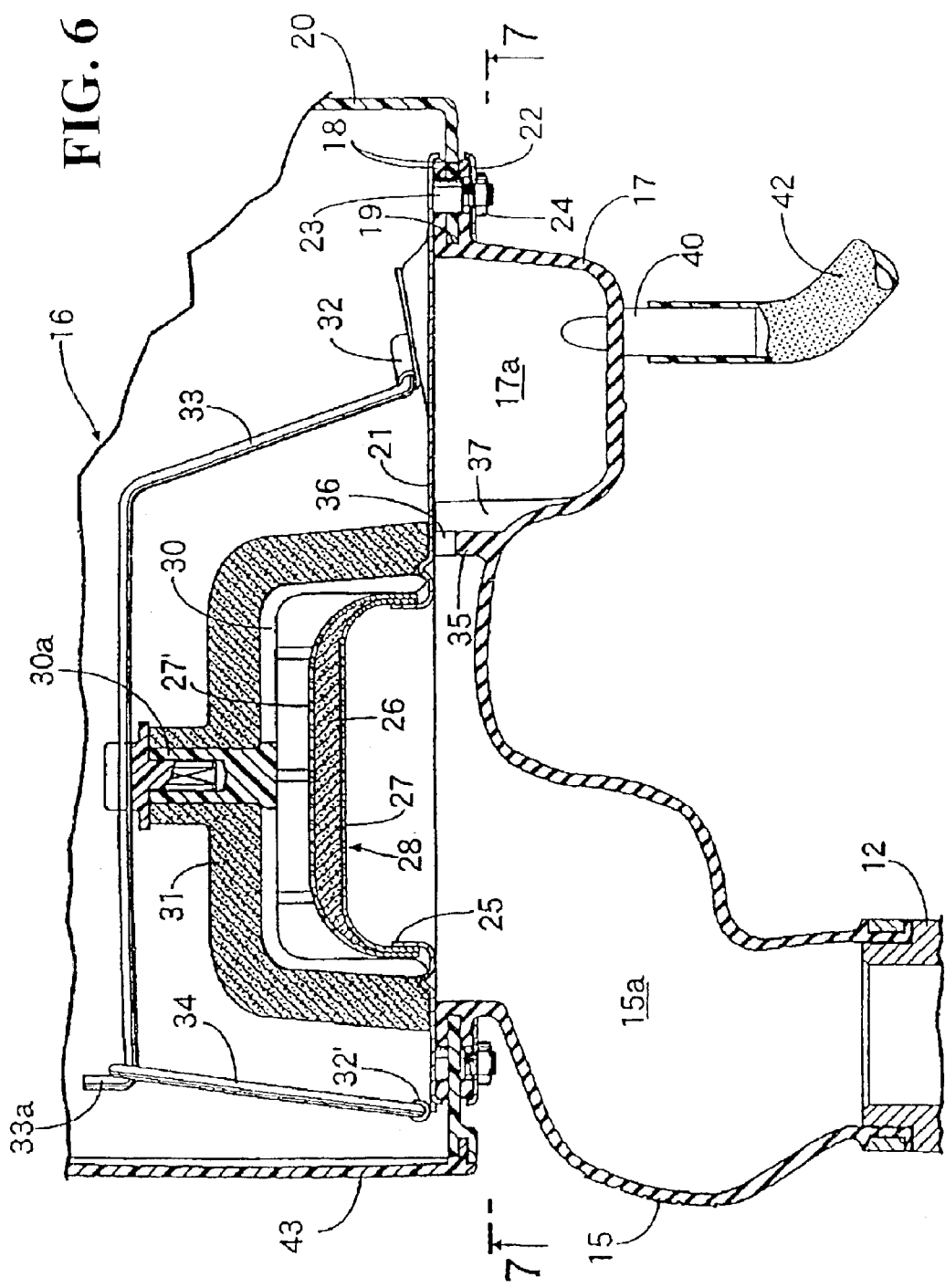
FIG. 6 is a sectional view taken along a line 6—6 in FIG. 3.
Figure 7:
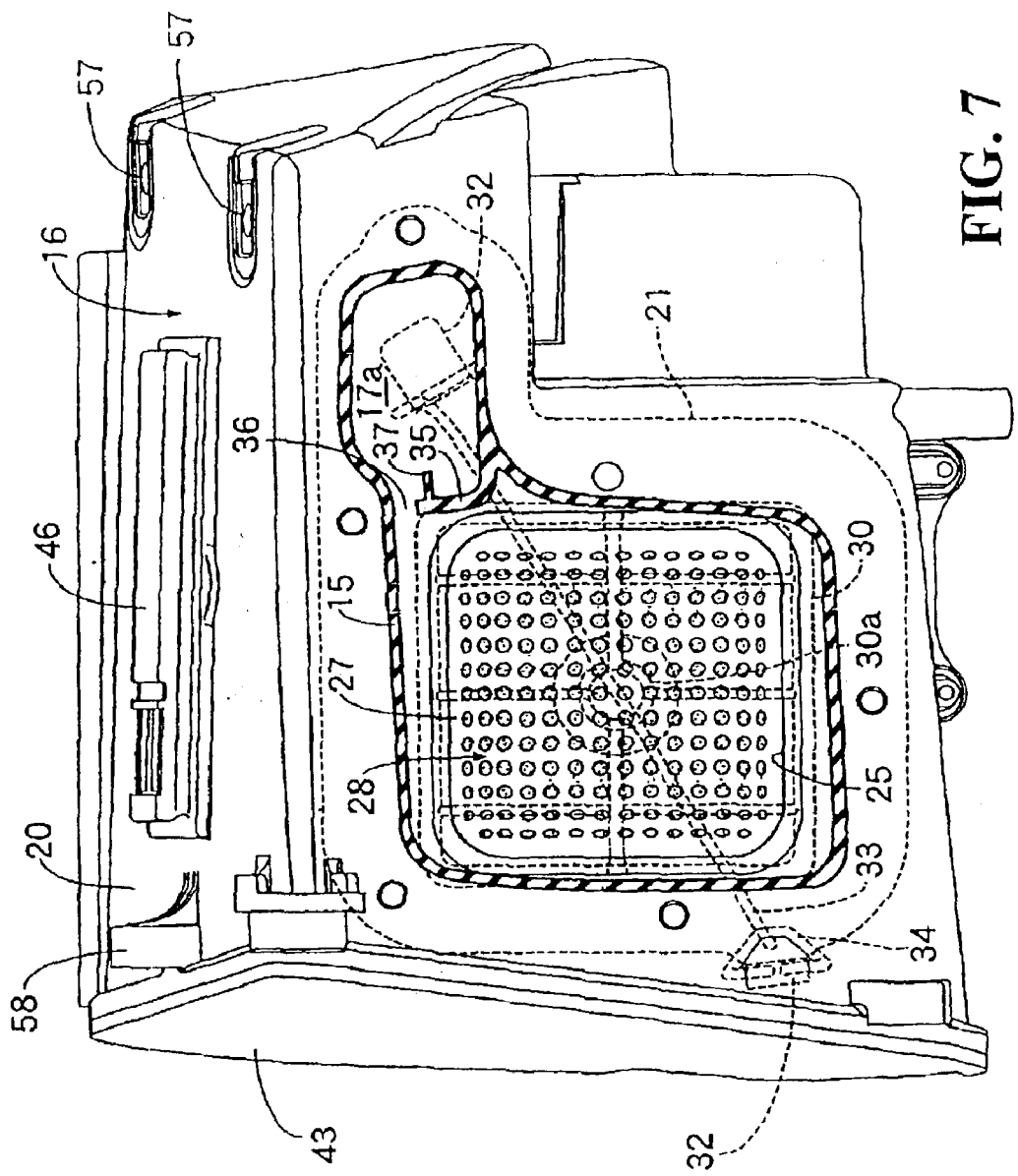
FIG. 7 is a sectional view taken along a line 7—7 in FIG. 6.
Figure 8:
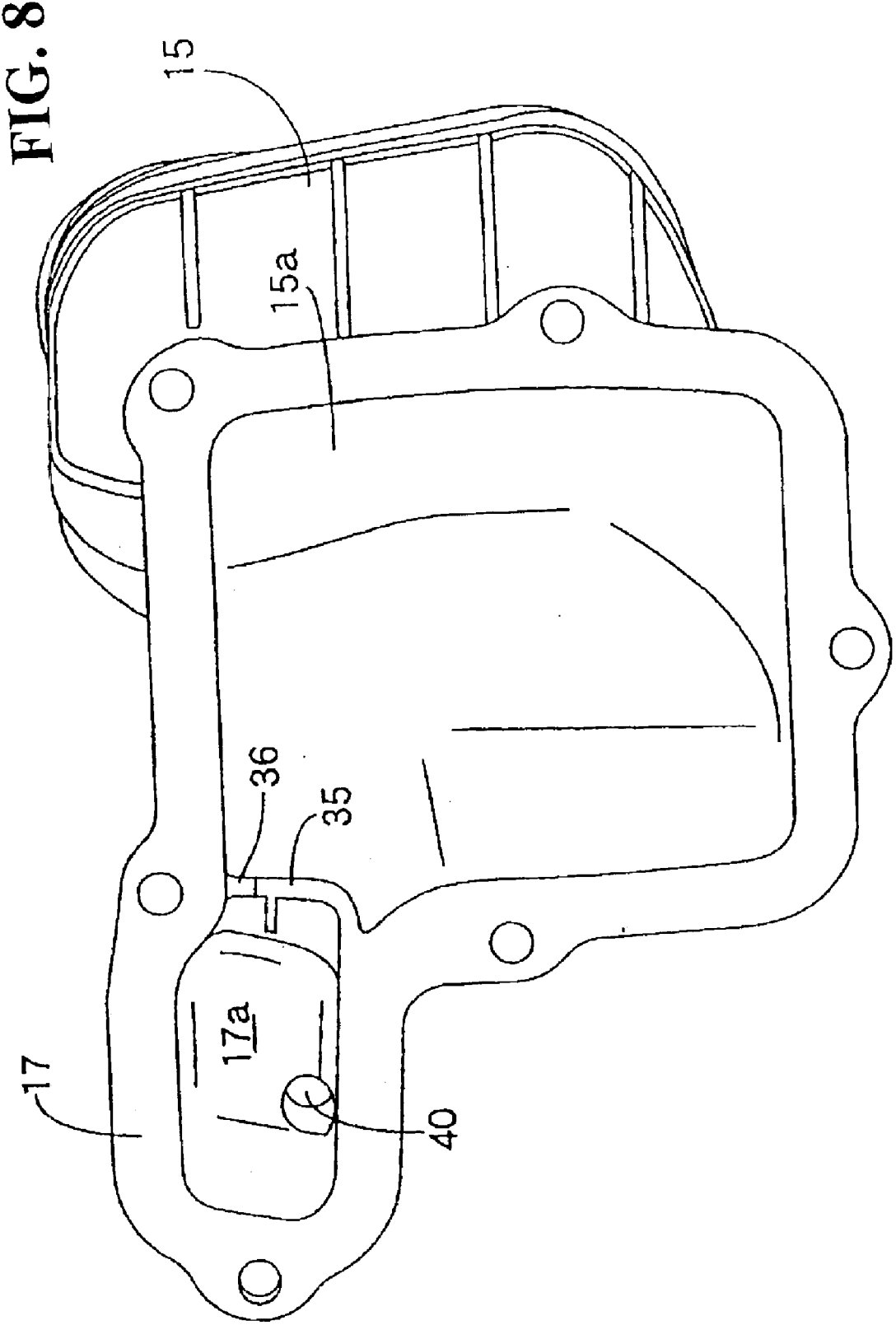
FIG. 8 is an end view with respect to the upstream side of a connecting tube.
Figure 9:
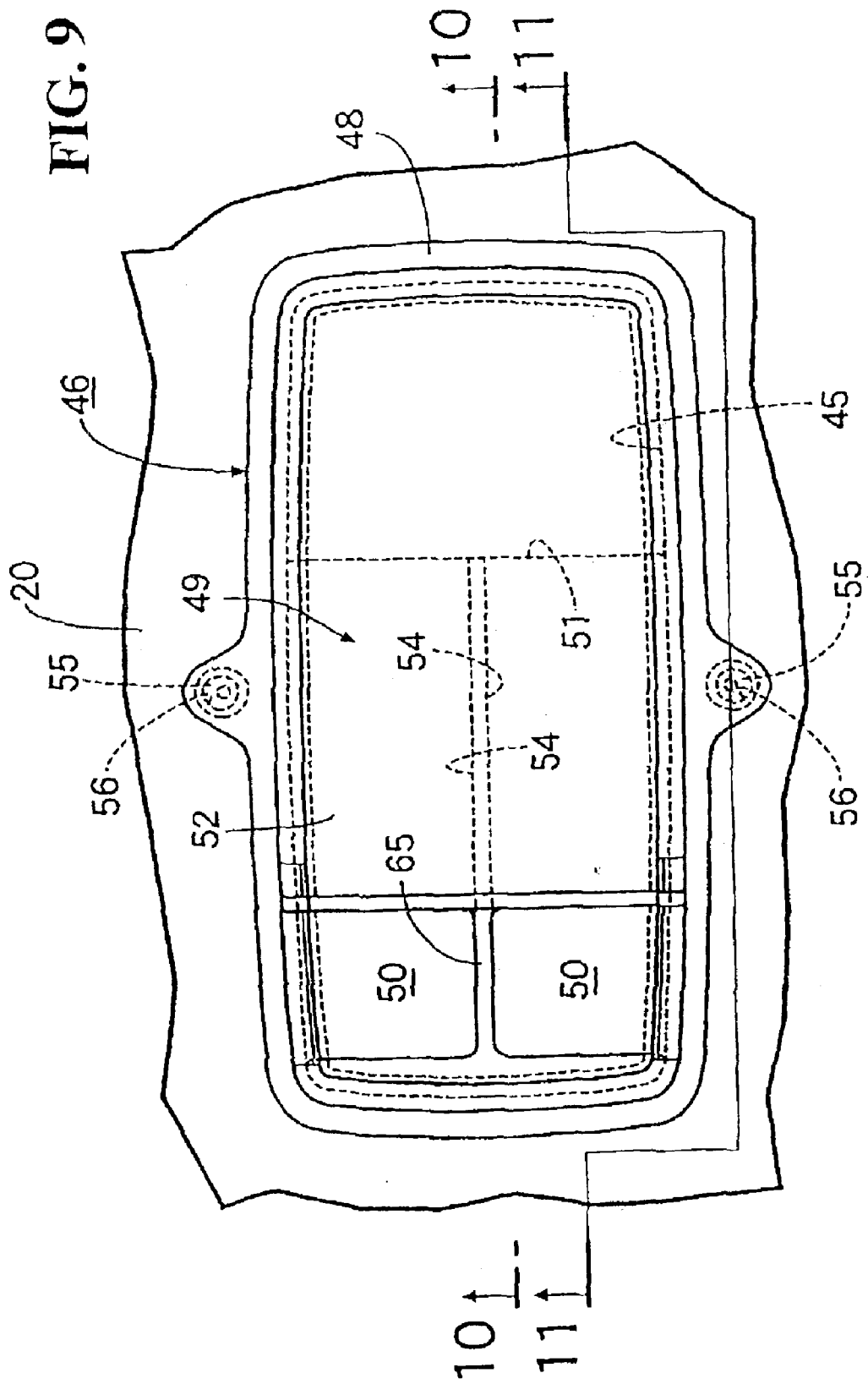
FIG. 9 is an enlarged view taken along a direction shown by an arrow 9 in FIG. 3.
Figure 10:
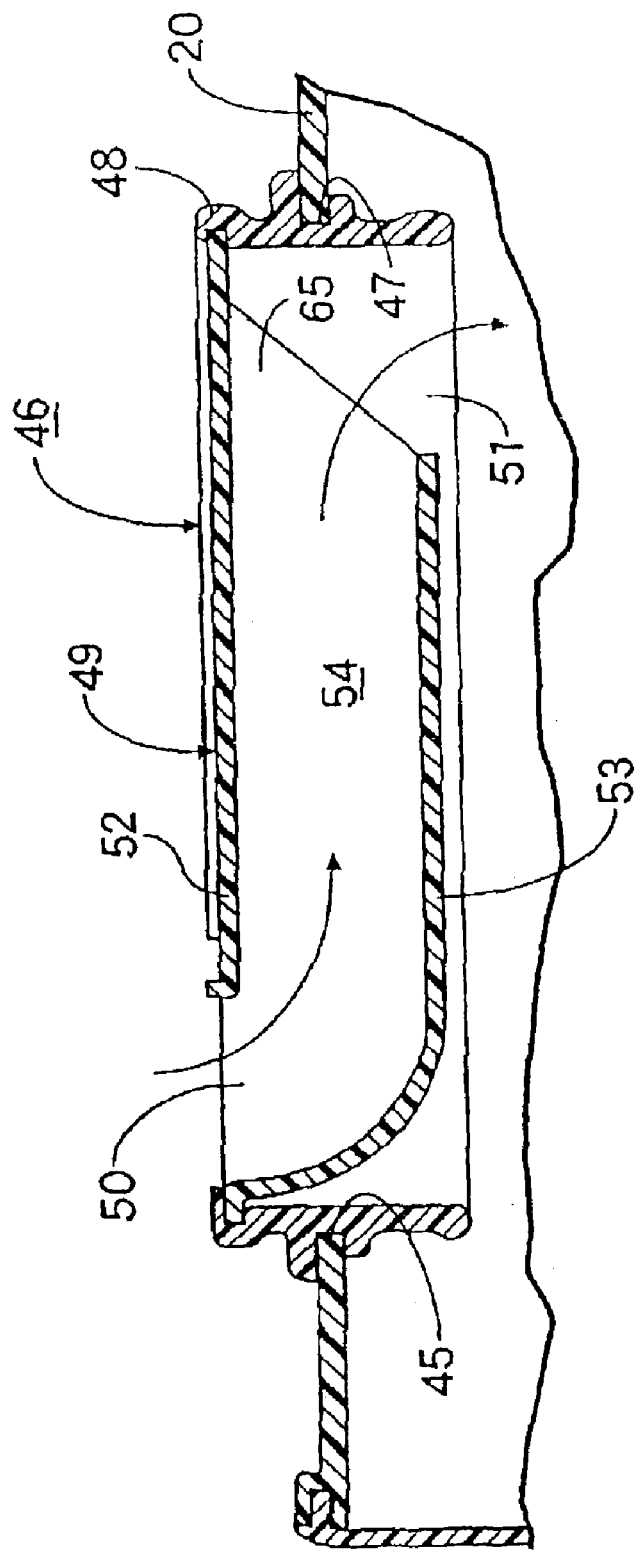
FIG. 10 is an enlarged view showing a main part of a portion shown in FIG. 4.
Figure 11:
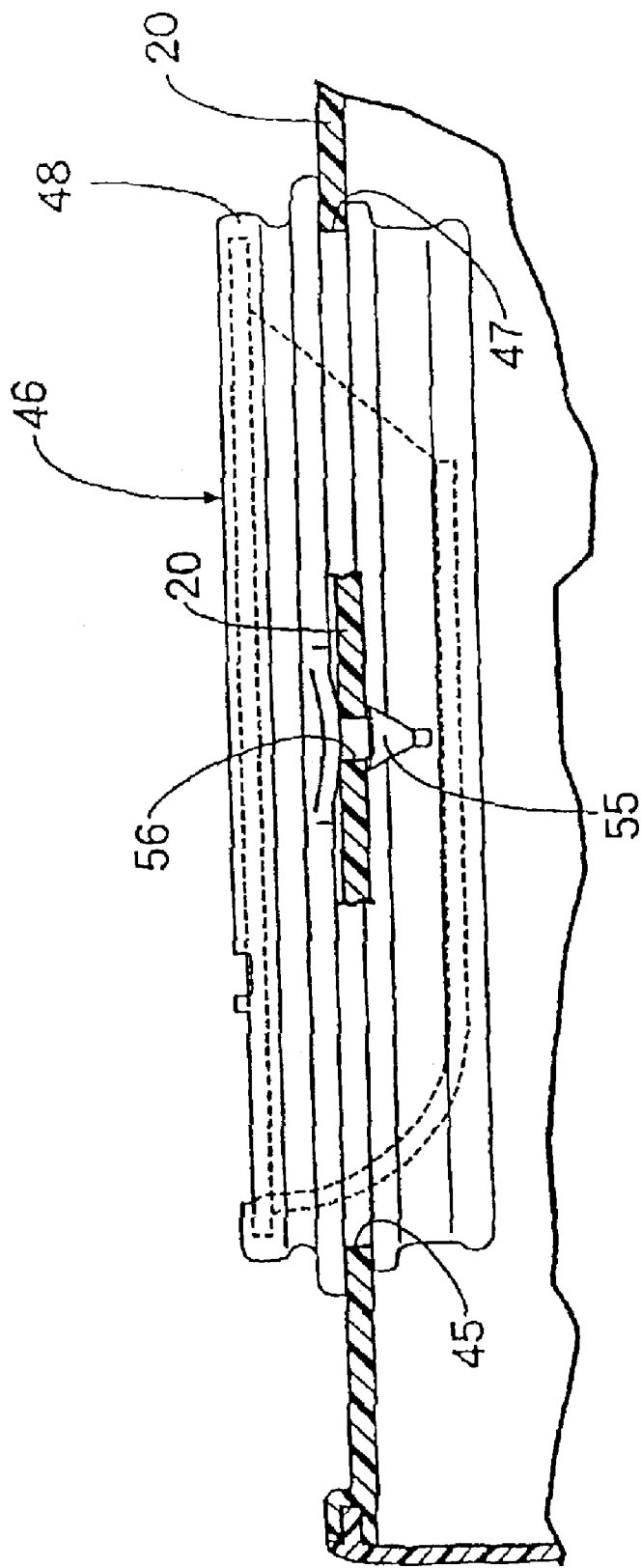
FIG. 11 is a sectional view viewed along a line II—II in FIG. 9.

The present invention will hereinafter be described with reference to the accompanying drawings. FIG. 1 is a left side view showing a motorcycle provided with a blowby gas processing system according to an embodiment of the present invention. FIG. 2 is an enlarged sectional view viewed along a line 2—2 in FIG. 1. FIG. 3 is an enlarged view showing a main part of a portion shown in FIG. 2. FIG. 4 is a view taken along a direction shown by an arrow 4 in FIG. 3. FIG. 5 is a side view showing a periphery of an air cleaner viewed from the side opposite to the side shown in FIG. 1. FIG. 6 is a sectional view taken along a line 6—6 in FIG. 3. FIG. 7 is a sectional view taken along a line 7—7 in FIG. 6. FIG. 8 is an end view with respect to the upstream side of a connecting tube. FIG. 9 is an enlarged view taken along a direction shown by an arrow 9 in FIG. 3. FIG. 10 is an enlarged view showing a main part of a portion shown in FIG. 4. FIG. 11 is a sectional view viewed along a line II—II in FIG. 9.

As shown in FIG. 1, an engine E, a fuel tank 2 arranged above the engine E and a seat 3 for occupants extending to the rear end of the fuel tank 2 are mounted on a body frame 1 of a motorcycle M. A front fork 5 for supporting a front wheel 4f is coupled to a head pipe 1h at the front end of the body frame 1 so that the front fork can be steered. A rear fork 6 for supporting a rear wheel 4r is coupled to a lower part of the center of the body frame 1 so that the rear fork can be vertically oscillated via a pivot 7. A rear cushion 9 is attached between the rear fork 6 and a bracket 8 fixed to the upside of the body frame 1. The output of the engine E is transmitted to the rear wheel 4r via a chain transmission gear 10.

A carburetor 12, the intake passage of which communicates with an inside intake port, is attached to the rear face of a cylinder head Eh of the engine E. An exhaust pipe 13 which communicates with an inside exhaust port is attached to the front face of the cylinder head Eh and the exhaust pipe 13 is connected to an exhaust muffler 14 arranged on one side of the body frame 1. As shown in FIGS. 2 to 7, an air cleaner 16 is connected on the entrance side of the intake passage of the carburetor 12 via a connecting tube 15. The connecting tube 15 is made of elastic material such as rubber and an expanded portion 17, the inside of which functions as a gas-liquid separating chamber 17a adjacent to an intake passage 15a in the connecting tube 15 is integrated with the upper portion of the upstream end.

A coupling flange 18, which also surrounds the expanded portion 17, is integrated with the periphery of the upstream end of the connecting tube 15. An annular groove 19 is provided in the periphery of the coupling flange 18, the end wall of a cleaner case 20 of the air cleaner 16 is fitted into the annular groove, an element setting plate 21 overlaps on the outer end face of the coupling flange 18 and a keep plate 22 overlaps on the inner end face of the coupling flange 18. Bolts 23, 23, which extend through the coupling flange 18 and the keep plate 22 are fixed to the element setting plate 21, and the coupling flange 18 and the end wall of the cleaner case 20 are held between the element setting plate 21 and the keep plate 22 by screwing nuts 24, 24 on the bolts.

The element setting plate 21 is provided with an opening 25 corresponding to the intake passage 15a in the connecting tube 15. A frame trap 28 holding steel wool 26 between a pair of punched plates 27, 27' or wire nettings is installed over the opening 25 and a cleaner element 31 supported by a grid-like element holder 30 is arranged so that the cleaner element covers the frame trap 28 from the outside. The element holder 30 is provided with a strut 30a holding the cleaner element 31 from the outside, piercing the center of the cleaner element 31.

A pair of hinge brackets 32, 32' is provided on the element setting plate 21 with the cleaner element 31 between the hinge brackets, a presser bar 33 made of a spring member for elastically pressing the head of the strut 30a on the side of the element setting plate 21 is supported by one hinge bracket 32 so that the presser bar can be turned, and a fitting ring 34 to which a hook 33a at the end of the presser bar 33 is fitted is supported by the other hinge bracket 32'. Therefore, when the hook 33a of the presser bar 33 is fitted to the fitting ring 34, the element holder 30 supporting the cleaner element 31 is fixed onto the element setting plate 21 by the spring of the presser bar 33. When the hook 33a is detached from the fitting ring 34 and the presser bar 33 is detached from the strut 30a, it becomes possible to extract and clean the cleaner element 31. One side in a lateral direction of the cleaner case 20 is open and a cover 43 normally closes this open face. When the cleaner element 31 is maintained, the cover 43 is detached and maintenance is performed from the open face of the cleaner case 20.

As shown in FIGS. 6 to 8, the gas-liquid separating chamber 17a is formed between the expanded portion 17 and the element setting plate 21 covering the open end of the expanded portion. A cut-out blowby gas exit 36 for making the upside of the gas-liquid separating chamber 17a communicate with the intake passage 15a and an oil return wall 37 protruded on the side of the gas-liquid separating chamber 17a below the blowby gas exit 36 and across the whole width in a horizontal direction of a partition 35 are formed in the partition 35 between the gas-liquid separating chamber 17a and the intake passage 15a in the connecting tube 15. An entrance joint 40 extending to a lower part of the gas-liquid separating chamber 17a is integrated with the expanded portion 17 and a breather port 41 (see FIG. 1) open to the top face of the rear of a crankcase Ec of the engine E for exhausting blowby gas is connected to the entrance joint 40 via a breather tube 42.

As shown in FIGS. 9 to 11, an air intake 45 is provided on the upper wall of the cleaner case 20 and an intake noise-damping box 46 is normally attached to the air intake so that the intake noise-damping box can be detached. The intake noise-damping box 46 is composed of a substantially rectangular frame 48 made of rubber having a peripheral groove 47 into which the circumference of the air intake 45 is fitted and a passage organizer 49 made of synthetic resin connected to the inside of the frame 48 by fitting. The passage organizer 49 is provided with an outside plate 52 in which an air entrance 50 is open to one end in a longitudinal direction and an inside plate 53 which is extended downward from one end of the outside plate 52, curving and in which an air exit 51 is open to the other end, and a pair of air passages 54, 54 for connecting the air entrance 50 to the air exit 51 are formed between the outside plate 52 and the inside plate 53.

A pair of couplers 55, 55 having an enlarged head are integrated with the outside of the frame 48. The coupling of the frame 48 to the cleaner case 20 is guaranteed by elastically fitting these into a pair of coupling holes 56, 56 made on the ceiling wall of the cleaner case 20. As shown in FIGS. 3 and 5, a pair of front and rear nuts 57, 57 are attached on one side in a lateral direction of the top face of the cleaner case 20, one ear piece 58 is integrated with the top face of the cleaner case on the other side and one side of the cleaner case 20 is fixed to one side of the body frame 1 by bolts 63, 63 (see FIG. 2) screwed to the nuts 57, 57. The ear piece 58 is connected to the other sides of the right and left body frames 1 by a bolt. The air cleaner 16 is supported by the body frame 1.

As shown in FIGS. 3 and 4, the expanded portion 17 forming the gas-liquid separating chamber 17a is integrated with the upside of the upstream end of the connecting tube 15 as described above. A battery box 59 made of synthetic resin for housing a battery 64 is coupled to the cleaner case 20 immediately under the expanded portion 17 and on one side of the connecting tube 15.

A coupling projection 60, the cross section of which is T type, is integrated with the back opposite to the cleaner case 20 of the battery box 59 and is fitted to a coupling groove 61, the cross section of which is T type and which is provided on the front of the cleaner case 20. A bracket 62 is integrated with the front of the batter box 59 and is connected to the body frame 1 by a bolt. The body frame 1 and the cleaner case 20 support the battery box 59.

As a result, dead space immediately under the expanded portion 17 and on one side of the connecting tube 15 is utilized as a space for installing the battery box 59. The periphery of the engine E can be compacted and the supporting structure of the battery box 59 can be simplified. As shown in FIGS. 1 and 3, the rear cushion 6 is arranged utilizing the dead space between the connecting tube 15 and the expanded portion 17. Next, the action of the embodiment of the invention will be described.

In an intake process of the engine E, after outside air that enters the air entrance 50 passes a pair of air passages 54, 54, being divided into a pair of air passages, the outside air enters the cleaner case 20 via the common air exit 51, is filtered by the cleaner element 31, passes the frame trap 28, further passes the connecting tube 15 and the carburetor 12 and is drawn in by the engine E after being mixed with jetted fuel in the carburetor 12. Intake noise caused in the air cleaner 16 is attenuated as the air passes a pair of air passages 54, 54 relatively narrowed, thereby reducing noise leaking outside.

However, in the case of a race in which the output of the engine E is regarded as important and the motorcycle M is driven more aggressively, if the intake noise-damping box 46 is detached from the cleaner case 20 and outside air is directly taken in from the air intake 45 (having a relatively larger opening), resistance to air intake is reduced and the output of the engine can be enhanced.

While the engine E is driven, blowby gas caused in the crankcase Ec flows into the gas-liquid separating chamber 17a from the breather port 41 via the breather tube 42. When the blowby gas is expanded, it is separated into gas and liquid, and separated oil again flows in the breather tube 42 downward and is returned into the crankcase Ec from the breather port 41. The blowby gas from which oil is separated is sent into the intake passage 15a in the connecting tube 15 via the blowby gas exit 36, and the gas is drawn into the engine E after being mixed with air passing through the intake passage 15a. The combustion process is executed with the separated gas and the additional air provided through the intake passage 15a.

Even if oil separated from blowby gas in the gas-liquid separating chamber 17a should rise along an inner wall on the side of the blowby gas exit 36 of the gas-liquid separating chamber 17a by the action of air manifold pressure, the oil can be prevented from entering the blowby gas exit 36 because the rise of the oil is prevented by the oil return wall 37 positioned before the blowby gas exit 36. Since the expanded portion 17 functioning as the gas-liquid separating chamber 17a is integrated with the connecting tube 15, an oil separator tank is not required to be specially provided before the breather tube 42. Therefore, additional means for supporting the tank is not required, and resulting system configuration can be simplified and the costs can be reduced.

Particularly, in case the gas-liquid separating chamber 17a is formed between the expanded portion 17 integrated with one side of the upstream end of the connecting tube 15 and the element setting plate 21 covering the open end and the cut-out blowby gas exit 36 is formed in the partition 35 between the gas-liquid separating chamber 17a and the intake passage 15a in the connecting tube 15, the element setting plate 21 joins the configuration of the gas-liquid separating chamber 17a, facilitates the formation of the gas-liquid separating chamber 17a, the number of parts is prevented from being increasing and the cost can be more reduced.

As described above, according to a first characteristic of the present invention, the engine blowby gas processing system where the breather tube extending from the breather port for exhausting blowby gas of the engine is connected to the connecting tube. Inside the connecting tube the intake passage connecting the carburetor and the air cleaner is formed. The expanded portion provided with the gas-liquid separating chamber adjacent to the intake passage and the entrance joint connecting the lower part of the gas-liquid separating chamber to the breather tube are integrated on one side of the connecting tube. The blowby gas exit for making the upside of the gas-liquid separating chamber communicate with the intake passage is provided on the partition between the gas-liquid separating chamber and the intake passage. The expanded portion provided with the gas-liquid separating chamber for separating oil from blowby gas is integrated with the connecting tube. Accordingly, an oil separator tank is not required to be specially inserted before the breather tube and means for supporting the tank is not required. Therefore, the configuration can be simplified and the cost can be reduced.

According to a second characteristic of the present invention, the air cleaner includes the cleaner case bonded to the upstream end of the connecting tube, the element setting plate provided with the opening corresponding to the intake passage and bonded to the connecting tube in the cleaner case and the cleaner element attached to the element setting plate so that the cleaner element covers the opening. The expanded portion is formed on one side of the upstream end of the connecting tube and the expanded portion and the element setting plate covering its open face form the gas-liquid separating chamber. The element setting plate joins the configuration of the gas-liquid separating chamber, facilitates the formation of the gas-liquid separating chamber, prevents the number of parts from being increased and reduces cost.

According to a third characteristic of the present invention, the oil return wall below the blowby gas exit and protruding from the side of the gas-liquid separating chamber is formed in the partition. The oil can be prevented from entering the blowby gas exit by the oil return wall before the blowby gas exit even if oil separated from blowby gas in the gas-liquid separating chamber rises along the inner wall on the side of the blowby gas exit of the gas-liquid separating chamber by the action of manifold air pressure.

Further, according to a fourth characteristic of the present invention, the expanded portion is formed on one side of the upper side of the upstream end of the connecting tube. The battery box for housing the battery is arranged immediately under the expanded portion and on the side of the connecting tube. Therefore, the dead space immediately under the expanded portion and on one side of the connecting tube is utilized as a space for installing the battery box and reducing the size of the periphery of the engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine blowby gas processing system for an engine comprising:
   an air cleaner;
   a carburetor;
   a breather port of said engine;
   a breather tube extending from the breather port for exhausting blowby gas of the engine, said breather tube being connected to a connecting tube;
   an intake passage being formed within said connecting tube and connecting the carburetor and the air cleaner;
   an expanded portion being provided with a gas-liquid separating chamber adjacent to the intake passage, wherein an entrance joint connecting a lower part of the gas-liquid separating chamber and the breather tube are integrally formed on a first side of the connecting tube; and a blowby gas exit communicating the upper portion of the gas-liquid separating chamber with the intake passage being provided in a partition between the gas-liquid separating chamber and the intake passage.

2. The engine blowby gas processing system according to claim 1, wherein the air cleaner further includes a cleaner case joined to the upstream end of the connecting tube, an element setting plate being provided with an opening corresponding to the intake passage and joined to the connecting tube in the cleaner case, and a cleaner element attached to the element setting plate so that the cleaner element covers the opening.

3. The engine blowby gas processing system according to claim 2, wherein the expanded portion is formed on an upper side of the upstream end of the connecting tube and the gas-liquid separating chamber is formed by the expanded portion, said element setting plate covering an open face of said expanded portion.

4. The engine blowby gas processing system according to claim 1, further comprising an oil return wall formed below the blowby gas exit, said oil return wall protruding from a side of the gas-liquid separating chamber and being formed in said partition.

5. The engine blowby gas processing system according to claim 2, further comprising an oil return wall formed below the blowby gas exit, said oil return wall protruding from a side of the gas-liquid separating chamber and being formed in said partition.

6. The engine blowby gas processing system according to claim 3, further comprising an oil return wall formed below the blowby gas exit, said oil return wall protruding from a side of the gas-liquid separating chamber and being formed in said partition.

7. The engine blowby gas processing system according to claim 1, further comprising a battery box for housing a battery, said battery box being arranged immediately beneath the expanded portion and on the first side of the connecting tube, wherein the expanded portion is formed on the first side of an upper portion of an upstream end of the connecting tube.

8. The engine blowby gas processing system according to claim 2, further comprising a battery box for housing a battery, said battery box being arranged immediately beneath the expanded portion and on the first side of the connecting tube, wherein the expanded portion is formed on the first side of an upper portion of an upstream end of the connecting tube.

9. The engine blowby gas processing system according to claim 3, further comprising a battery box for housing a battery, said battery box being arranged immediately beneath the expanded portion and on the first side of the connecting tube, wherein the expanded portion is formed on the first side of the upper portion of the upstream end of the connecting tube.

10. The engine blowby gas processing system according to claim 6, further comprising a battery box for housing a battery, said battery box being arranged immediately beneath the expanded portion and on the first side of the connecting tube, wherein the expanded portion is formed on the first side of the upper portion of the upstream end of the connecting tube.

11. The engine blowby gas processing system according to claim 10, further comprising:

a coupling flange surrounding the expanded portion and having a periphery corresponding to a shape of the connecting tube;

an annular groove being provided in the periphery of the coupling flange; and an end wall of the cleaner case of the air cleaner being fitted into the annular groove.

12. The engine blowby gas processing system according to claim 11, wherein the element setting plate overlaps an outer end face of the coupling flange.

13. The engine blowby gas processing system according to claim 12, further comprising an opening corresponding to the intake passage in the connecting tube is provided in the element setting plate;

a frame trap holding steel wool between a pair of punched plates is installed over the opening; and a grid-like element holder supporting said cleaner element and being arranged so that the cleaner element covers the frame trap from the outside.

14. The engine blowby gas processing system according to claim 13, wherein the element holder is provided with a strut holding the cleaner element from the outside and a pair of hinge brackets is provided on the element setting plate with the cleaner element being held between the hinge brackets.

15. The engine blowby gas processing system according to claim 14, further comprising:

a presser bar elastically pressing a head of the strut on the side of the element setting plate supported by one of said hinge brackets; and a fitting ring having a hook at the end of the presser bar, said fitting ring being supported by another of said pair of hinge brackets.

* * * * *